Dec. 8, 1959    R. MÖLLER ET AL    2,916,285
FILM TRANSPORTING APPARATUS
Filed July 6, 1954    2 Sheets-Sheet 1

INVENTORS:
ROLF MÖLLER AND
HORST ZSCHAU
BY

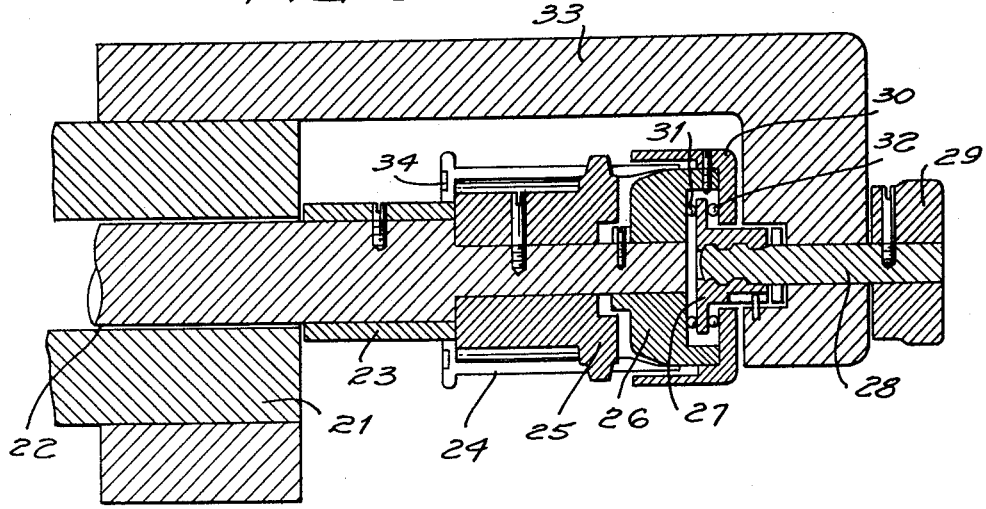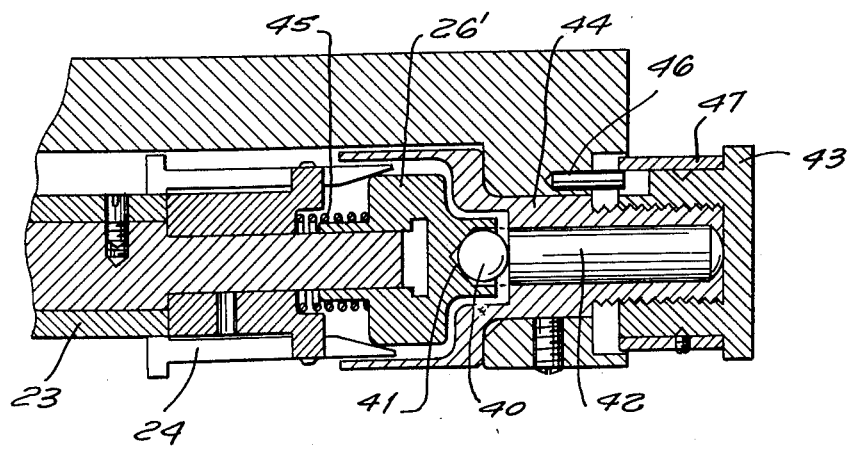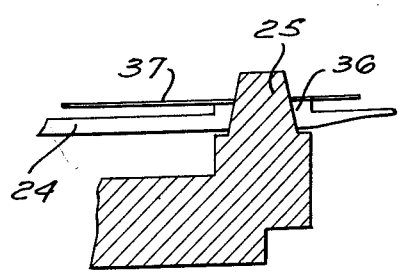

ized Dec. 8, 1959

2,916,285

FILM TRANSPORTING APPARATUS

Rolf Möller, Darmstadt-Eberstadt, and Horst Zschau, Darmstadt, Germany, assignors to Firma Fernseh G.m.b.H., Darmstadt, Germany Application July 6, 1954, Serial No. 441,504

Claims priority, application Germany July 3, 1953

5 Claims. (Cl. 271—2.3)

The present invention relates to film televising apparatus and more particularly to a film shrinkage compensation device particularly suitable for use in a film televising apparatus.

It is well known that film shrinks. Thus, nitrocellulose film will shrink during aging from 0 to 1.2% and safety film will shrink during aging from 0 to 0.8%. Optical devices are known which compensate for such film shrinkage so that the projection of such film is not affected by the shrinkage. In film televising machines the televising of 35 mm. film which has four perforations for each film frame is unaffected by shrinkage of the film. However, where smaller film is televised, such as 16 mm., 8 mm. or 9.5 mm. film, shrinkage will greatly detract from the quality of the images transmitted since there is only one perforation for each frame.

One of the objects of the present invention is to provide a structure for compensating for the shrinkage of film to be televised.

Another object of the present invention is to automatically adjust parts of the apparatus such as optical and scanning means of the apparatus when adjustments are made to compensate for film shrinkage.

A further object of the present invention is to provide an automatic shrinkage compensating structure.

An additional object of the present invention is to provide a manually operable adjusting means for adjusting the diameter of a circle along which film is transported while the film engages a toothed wheel of the film transporting means of the apparatus.

With the above objects in view the present invention mainly consists of a film televising apparatus which includes a means for producing electrical signals corresponding to the pictures on a film moving by a film gate of the apparatus. An adjustable toothed wheel means for compensating for shrinkage of the film is provided, this toothed wheel means forming part of the film transporting means of the apparatus and being capable of selecting the diameter of the circle along which the film moves while engaging the teeth of the toothed wheel.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 2 is a fragmentary sectional view of a film transporting toothed wheel means constructed in accordance with the present invention, the section of Fig. 2 being taken along the axis of the shaft which carries the film transporting toothed wheel;

Fig. 3 is a fragmentary sectional detailed view on an enlarged scale of a tooth of the toothed wheel and the structure associated with this tooth; and Fig. 4 is a fragmentary sectional view corresponding to Fig. 2 of an embodiment different from Fig. 2.

Figure 1:
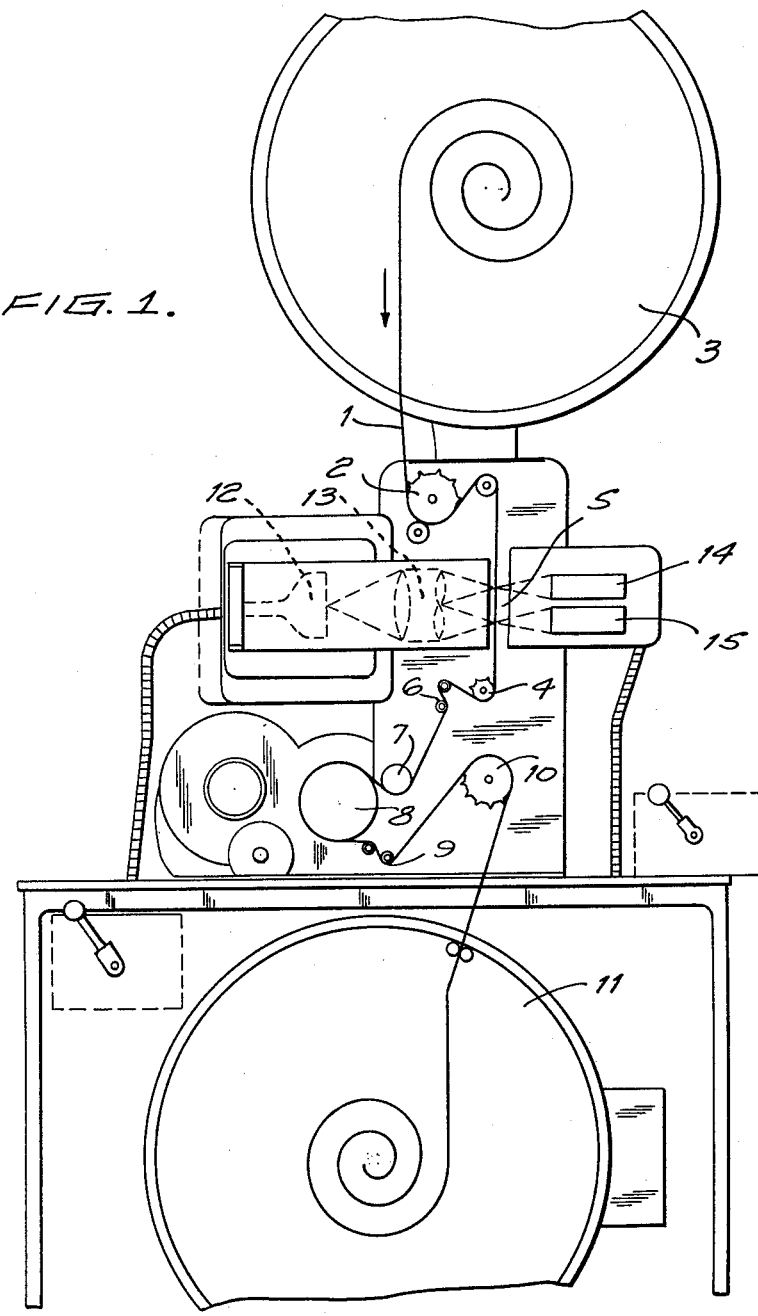
Fig. 1 is a schematic illustration of a film televising apparatus including the structure of the invention.

Referring now to the drawings, Fig. 1 illustrates only those parts of the film televising apparatus which are necessary to afford an understanding of the invention. Thus, the film supply spool 3 is shown at the top of Fig. 1, and the film 1 is moved downwardly from spool 3 by the toothed wheel 2 at a uniform speed so as to form a loop, the film then being transported by the toothed wheel 4 having eight teeth. The wheel 4 moves the film by a film gate 5 and from the wheel 4 the film is guided by rollers 6 and 7 to a wheel 8 of a sound producing device, this wheel 8 guaranteeing uniform movement of the film through the sound producing device in a known way. Then the film moves along rollers 9 to the toothed wheel 10 and from the latter to the take-up spool 11.

While the film moves through the film gate it is scanned so that, for example, where the film speed is 25 frames per second 50 scannings will take place; that is, each film frame will be scanned twice. For this purpose the fluorescent spot of the cathode ray tube 12 is guided across the film, by a double optical system 13, at two places which are spaced from each other in the direction of film movement. In this way light is passed through the film frames and in accordance with the pictures on the film frames more or less light will arrive at the photocells 14 and 15 corresponding to the two parts of the optical system and spaced in the same way in the direction of film movement. Means are provided for alternately energizing the photocells 14 and 15 during the scannings so that the light moving to the photocells is transformed into a series of electrical signals which serve to transmit the pictures.

In accordance with the present invention, the above structure includes a means associated with the film transporting toothed wheel 4 for adjusting the diameter D of the circle along which the film moves while engaging the teeth of this toothed wheel. Fig. 2 illustrates one embodiment of a structure for accomplishing this result. Referring to Fig. 2, it will be seen that a shaft 22 is turnably carried for rotation about its axis in the projector housing 21. This shaft 22 carries a drum-like member 23 which is made of a springy material and includes at its left end portion a sleeve fixed to a shaft 22, as shown in Fig. 2. At the right end of this sleeve, as viewed in Fig. 2, there is an annular end wall of the drum-like member which is fixed to the sleeve thereof, and a cylindrical portion of the drum-like member extends from the end wall thereof to the right toward and beyond the teeth of the wheel 25. The cylindrical portion of the drum-like member is slotted along its entire length to provide a plurality of springy strips 24 extending freely from the end wall, and the latter is radially slotted up to the sleeve portion mounted on the shaft 22, as is evident from Fig. 2. It will be noted that the inner surface of the right end portion of the drum-like member is conical so that the springy strips have conical surfaces at their free end portions. The toothed wheel 25, corresponding to the toothed wheel 4, is also fixed to shaft 22 for rotation therewith and has in the illustrated example eight teeth, the drum-like member being provided with eight springy strips 24, in this case, which extend through the gaps between the teeth of the toothed wheel, respectively.

A spreader member 26 is mounted on the shaft 22 for slidable movement therealong while being constrained to rotate therewith, the member 26 having an outer conical surface which engages the inner conical faces of the strips 24. The spreader member 26 is formed in its hub portion with an axial slot into which extends the head of a screw fixed to the shaft 22, so that in this way member 26 rotates with the shaft 22 while being slidable therealong. Upon axial movement of member 26 to the left, as viewed in Fig. 2, the outer free ends of strips 24 are moved outwardly away from the shaft 22 so that as a result the strips 24 at the portions thereof located between the teeth of wheel 25 become located along a circle D whose diameter increases with movement of member 26 toward the toothed wheel. Since the teeth of toothed wheel taper outwardly, the film perforations are engaged by differently spaced portions of the teeth as the film is moved in radial direction. Thereby, different spacing of the perforations caused by shrinkage is compensated. In the embodiment of Fig. 2, the axial movement of member 26 is brought about by a tubular member 27 formed in its outer surface with an axial slot into which extends a pin fixed to the stationary support 33 of the apparatus. Thus, the tubular member 27 which is coaxial with shaft 22 can only move along its axis. The tubular member 27 is provided with interior threads cooperating with threads on a threaded shaft 28 which is turnably carried by support 33. A knurled knob 29 is fixed to the outer end of shaft 28 so that the latter may be manually rotated, and a pin fixed to shaft 28 between member 27 and support 33 prevents axial shifting of shaft 28. The tubular member 27 has an outwardly extending annular flange at its left end, as viewed in Fig. 2, and this flange extends between a pair of ball bearings 31 and 32, as shown in Fig. 2. Thus, when knob 29 is turned to move member 27 to the left, member 27 will shift spreader member 26 to the left through the ball bearing 31. The ball bearing 32 cooperates with a cap member 30 which is fixed to the spreader member 26 for moving the latter to the right when the knob 29 is turned so as to move member 26 to the right, as viewed in Fig. 2.

With the above construction it is essential that shaft 22 and screw member 28 be coaxial. The stationary support 33 guarantees that the screw member 28 is coaxial with the shaft 22. A scale of film shrinkage percentages is located on the knob 29 along its cylindrical outer surface, and this scale cooperates with an index on the stationary support 33 so that the apparatus of Fig. 2 may be properly adjusted by the operator to compensate for film shrinkage. The dimensions of the drum-like member 23 and the toothed wheel 25 are so chosen that the strips 24 take care of a film shrinkage of 1.5%, when the strips 24 are in their rest position located at their entire length along a part of a cylinder. For smaller shrinkages the spreader member 26 is moved to the left, as viewed in Fig. 2, by turning of knob 29. In this way the strips 24 are spread apart so that they are located at their portions between the teeth of wheel 25 along a cylinder whose diameter compensates for film shrinkage by locating the film radially away from the axis of shaft 22 at a distance therefrom where the space between successive film perforations corresponds to the space between the teeth of wheel 25. The adjustability extends from a compensation for 1.5% shrinkage down to 0%, and it will be noted that the apparatus is infinitely adjustable within this range since the adjustment is stepless.

In order to improve the springy movement of the strips 24, the end wall of the drum-like member 23 is formed with an annular groove 34. This annular groove is divided by the radial grooves in the end wall into a plurality of arcuate grooves, and the width of these arcuate grooves is preferably of such a size that a straight line, such as a chord of a circle, may be located completely within each arcuate groove when this chord has a length corresponding to the distance between a pair of successive radial slots of the end wall at the place where the groove 34 is located. With such an arrangement the turning of the strip 24 toward and away from the shaft 22 will take place almost entirely at the groove 34.

With respect to the cap 30, it will be noted that this cap 30, in addition to serving the above described function of enabling the spreader member 26 to be moved to the right, as viewed in Fig. 2, extends over the free ends of strips 24 to protect the conical surfaces from dust.

Fig. 3 shows on an enlarged scale one of the teeth of wheel 25 and a part of a strip 24 associated therewith. Thus, it will be noted that in the region of each tooth of wheel 25 the strip 24 is provided with a projection 36, and all of the projections 36 have outer surfaces located along a common cylinder so that a definite support surface for the film is provided between the teeth. It will be noted that the film 37 rests only on the projection 36 of each strip 24.

Fig. 4 of the drawings illustrates a different embodiment of the structure of Fig. 2. According to Fig. 4 the spreader member 26' is provided in its right end face, as viewed in Fig. 4, with a centrally located recess 41 in which a ball member 40 is turnably located, recess 41 being conical. Axial pressure on ball member 40 is produced by an elongated pin 42 through the knurled knob 43. The pin 42 is slidably located within a sleeve 44 having at its right end portion outer threads in engagement with inner threads of the knob 43, and it will be noted that the sleeve 44 is fixed by a set screw on the stationary support. Thus, upon turning of knob 43, the inner right surface thereof, as viewed in Fig. 4, will through engagement with the right convexly curved end of pin 42 move the latter to the left, for example, as viewed in Fig. 4, so as to move the spreader member 26' to the left, the spreader member engaging the conical faces of strips 24 to spread the latter apart from each other, in this instance. The parts 23—25 and the shaft carrying the same are identical in Figs. 2 and 4. The movement of spreader member 26 to the right, as viewed in Fig. 4, is brought about by a coil spring 45 having one end abutting against wheel 25 and the other end abutting against member 26'. Thus, as knob 43 is turned so as to move to the right, as viewed in Fig. 4, spring 45 will shift member 26' to the right maintaining ball 40 in engagement with pin 42 and maintaining the latter in engagement with knob 43. The advantage of the embodiment of Fig. 4 resides in the fact that the axis of shaft 22 need not coincide with the turning axis of knob 43. This result is brought about through the left flat end face of pin 42 which engages the ball 40, this end face being located in a plane normal to the axes of shaft 22 and knob 43.

The turning of this knob is limited by a pin 46 which extends into an arcuate groove formed in the knob 43 and extending through less than 360°.

Furthermore, a scale 47 is located on the knob 43, and this scale may be angularly adjusted on knob 43 for zeroing the scale.

Although a manually adjustable device is described above, it should be noted that the film shrinkage may be automatically compensated for by spreading strips 24 in accordance with an automatic means for determining the spacing between the perforations of the film. For example, light passing through the film perforations onto a photocell arrangement may be used for automatically actuating the adjusting mechanism. Also, automatic adjustment of the means for optically compensating for film shrinkage may be coupled with the above described adjustable toothed wheel film transporting means. In particular, the adjustment of strips 24 may be interconnected with the scanning devices such as the photocells 14 and 15 for automatically spacing the latter from each other in accordance with adjustments made to compensate for shrinkage.

It will be understood that each of the elements described above, or two or more together, may also find a useful application in other types of film televising apparatus differing from the types described above.

While the invention has been illustrated and described as embodied in film shrinkage compensating means for film televising apparatus, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a film televising apparatus an adjustable toothed wheel means for compensating for shrinkage of the film, said toothed wheel means forming part of the film transporting means of the apparatus, and said toothed wheel means comprising a rotatable shaft, a toothed wheel fixed on said shaft for rotation therewith and having teeth, and a resilient drum-like member also fixed to said shaft for rotation therewith, said drum-like member having one annular end wall through which said shaft extends and a substantially cylindrical portion extending from said end wall toward and beyond said toothed wheel, said cylindrical portion of said drum-like member being formed along its entire length with a plurality of axial slots through which the teeth of said wheel extend to form a plurality of strips extending from said end wall, said strips being adapted to support film portions located between film perforations in which said teeth are located for transporting the film, said end wall being formed with radial slots forming continuations of said axial slots, respectively, said end wall being further formed with an annular groove extending about said shaft so that movement of said strips from said end wall toward and away from said shaft takes place mainly at said annular groove, and a spreader member located on said shaft for movement therealong adjacent to said toothed wheel on the side thereof opposite from said end wall of said drum, said spreader member having a surface engaging the surface at the free end portions of said strips for moving the latter outwardly away from said shaft upon axial movement of said spreader member therealong, at least one of said surfaces being conical whereby the film is positively transported by differently spaced portions of said teeth.

2. In a film televising apparatus an adjustable toothed wheel means for compensating for shrinkage of the film, said toothed wheel means forming part of the film transporting means of the apparatus, and said toothed wheel means comprising a rotatable shaft, a toothed wheel fixed on said shaft for rotation therewith and having teeth, and a resilient drum-like member also fixed to said shaft for rotation therewith, said drum-like member having one annular end wall through which said shaft extends and a substantially cylindrical portion extending from said end wall toward and beyond said toothed wheel, said cylindrical portion of said drum-like member being formed along its entire length with a plurality of axial slots through which the teeth of said wheel extend to form a plurality of strips extending from said end wall, said strips being adapted to support film portions located between film perforations in which said teeth are located for transporting the film, said end wall being formed with radial slots forming continuations of said axial slots, respectively, said end wall being further formed with an annular groove extending about said shaft so that movement of said strips from said end wall toward and away from said shaft takes place mainly at said annular groove, and a spreader member located on said shaft for movement therealong adjacent to said toothed wheel on the side thereof opposite from said end wall of said drum, said spreader member having a surface engaging the surface at the free end portions of said strips for moving the latter outwardly away from said shaft upon axial movement of said spreader member therealong, at least one of said surfaces being conical whereby the film is positively transported by differently spaced portions of said teeth, said conical surface being conical to an extent which will gradually increase the diameter of a circle along which said strips are located by at least 1.5%.

3. In a film televising apparatus an adjustable toothed wheel means for compensating for shrinkage of the film, said toothed wheel means forming part of the film transporting means of the apparatus, and said toothed wheel means comprising a rotatable shaft, a toothed wheel fixed on said shaft for rotation therewith and having teeth, and a resilient drum-like member also fixed to said shaft for rotation therewith, said drum-like member having one annular end wall through which said shaft extends and a substantially cylindrical portion extending from said end wall toward and beyond said toothed wheel, said cylindrical portion of said drum-like member being formed along its entire length with a plurality of axial slots through which the teeth of said wheel extend to form a plurality of strips extending from said end wall, said strips being adapted to support film portions located between film perforations in which said teeth are located for transporting the film, said end wall being formed with radial slots forming continuations of said axial slots, respectively, said end wall being further formed with an annular groove extending about said shaft so that movement of said strips from said end wall toward and away from said shaft takes place mainly at said annular groove, and a spreader member located on said shaft for movement therealong adjacent to said toothed wheel on the side thereof opposite from said end wall of said drum, said spreader member having a surface engaging the surface at the free end portions of said strips for moving the latter outwardly away from said shaft upon axial movement of said spreader member therealong, at least one of said surfaces being conical whereby the film is positively transported by differently spaced portions of said teeth and a pair of ball bearings operatively connected to said spreader member, an operating member extending between and engaging said pair of ball bearings for shifting the latter and said spreader member therewith in opposite directions along said shaft.

4. In a film televising apparatus an adjustable toothed wheel means for compensating for shrinkage of the film, said toothed wheel means forming part of the film transporting means of the apparatus, and said toothed wheel means comprising a rotatable shaft, a toothed wheel fixed on said shaft for rotation therewith and having teeth, and a resilient drum-like member also fixed to said shaft for rotation therewith, said drum-like member having one annular end wall through which said shaft extends and a substantially cylindrical portion extending from said end wall toward and beyond said toothed wheel, said cylindrical portion of said drum-like member being formed along its entire length with a plurality of axial slots through which the teeth of said wheel extend to form a plurality of strips extending from said end wall, said strips being adapted to support film portions located between film perforations in which said teeth are located for transporting the film, said end wall being formed with radial slots forming continuations of said axial slots, respectively, said end wall being further formed with an annular groove extending about said shaft so that movement of said strips from said end wall toward and away from said shaft takes place mainly at said annular groove, and a spreader member located on said shaft for movement therealong adjacent to said toothed wheel on the side thereof opposite from said end wall of said drum, said spreader member having a surface engaging the surface at the free end portions of said strips for moving the latter outwardly away from said shaft upon axial movement of said spreader member therealong whereby the film is positively transported by differently spaced portions of said teeth, at least one of said surfaces being conical, and said spreader member having distant from said toothed wheel an end face formed with a recess, a ball member located in said recess so that when said ball member is urged toward said toothed wheel said spreader member will spread said strips away from the axis of said wheel, and a spring engaging said spreader member for urging the latter away from said toothed wheel.

5. In a film transporting apparatus, a rotatable shaft; a toothed wheel having teeth and carried by said shaft for rotation therewith to transport a film into whose perforations the teeth of said wheel extend; a plurality of springy strips respectively extending through the gaps between said teeth and being substantially parallel to the axis of said shaft, said strips being adapted to support film portions located between film perforations in which said teeth are located for transporting the film; and means engaging said strips for moving the latter outwardly away from the axis of said shaft to increase the diameter of the circle along which the film moves when in engagement with the teeth of said wheel whereby the film is positively transported by differently spaced portions of said teeth.

References Cited in the file of this patent

UNITED STATES PATENTS

| | | |
|---|---|---|
| 459,265 | Barton | Sept. 8, 1891 |
| 1,085,908 | Hoe | Feb. 3, 1914 |
| 1,882,014 | Howell | Oct. 11, 1932 |
| 2,120,735 | Debrie | June 14, 1938 |
| 2,483,155 | Salfisberg | Sept. 27, 1949 |
| 2,601,790 | Magnusson | July 1, 1952 |
| 2,750,442 | Bedford | June 12, 1956 |